United States Patent

[11] 3,600,590

[72] Inventor Harry Einstein
c/o Nebetco Engineering, 1107 Chandler Ave., Roselle, N.J. 07203
[21] Appl. No. 774,871
[22] Filed Nov. 12, 1968
[23] Continuation-in-part of Ser. No. 681,517, Nov. 8, 1967, Patent No. 3,541,336
[45] Patented Aug. 17, 1971

[54] GAS MEASURING APPARATUS FOR DETECTING CONTAMINANTS
23 Claims, 14 Drawing Figs.
[52] U.S. Cl.................................................. 250/218, 356/207, 250/234
[51] Int. Cl........................................................ G01n 21/26
[50] Field of Search.......................................... 250/218, 83.3, 234, 226; 356/207, 208

[56] References Cited
UNITED STATES PATENTS

| 616,760 | 12/1898 | Baker | 356/233 |
|---|---|---|---|
| 1,785,393 | 12/1930 | Sawford | 356/207 |
| 1,976,672 | 10/1934 | Peet | 356/185 |
| 2,082,252 | 6/1937 | McDill | 356/208 |
| 2,363,473 | 11/1944 | Ryder | 250/218 |
| 2,930,893 | 3/1960 | Carpenter et al. | 250/83.3 |
| 3,317,730 | 5/1967 | Hilsum | 250/83.3 |

Primary Examiner—Walter Stolwein
Attorney—Lawrence I. Lerner

ABSTRACT: Gas measuring apparatus is disclosed for detecting the presence of particles and other contaminants suspended in exhaust gases and the like. The apparatus includes a sensing system, preferably a photoelectric transceiver including a light source and detector mounted within a single housing, located out of the path of the gas being measured to prevent the contamination thereof. The sensing system disperses visible light (ultraviolet or infrared may be utilized) into the gas being measured such that the amount of light reflected and detected provides an output signal representative of the presence of particles and other contaminants suspended in the gas. An output system including an appropriate meter is responsive to the signal developed by the sensing system to provide a visible indication of the pollution of the gas. Various types of positioning frame assemblies may be utilized in conjunction with the basic system to extend its applicability to many common types of pollution expelling environments. Each of these embodiments may additionally be provided with a self-contained calibration unit for establishing predetermined levels for the measurement of pollutants.

PATENTED AUG 17 1971 3,600,590
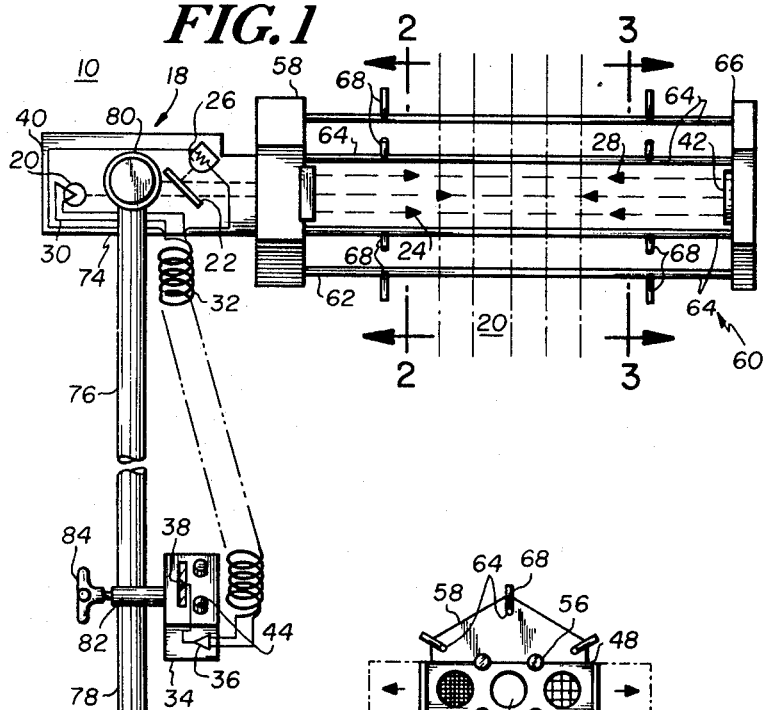
FIG.1
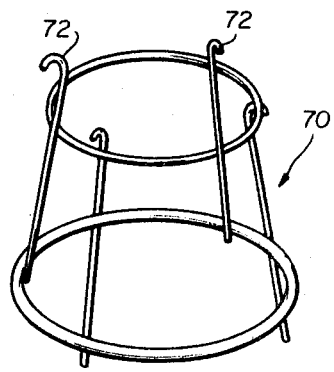
FIG.1a
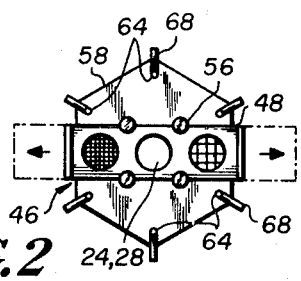
FIG.2
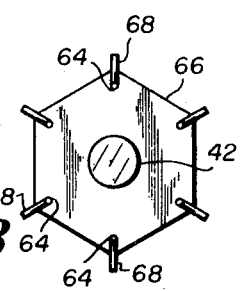
FIG.3
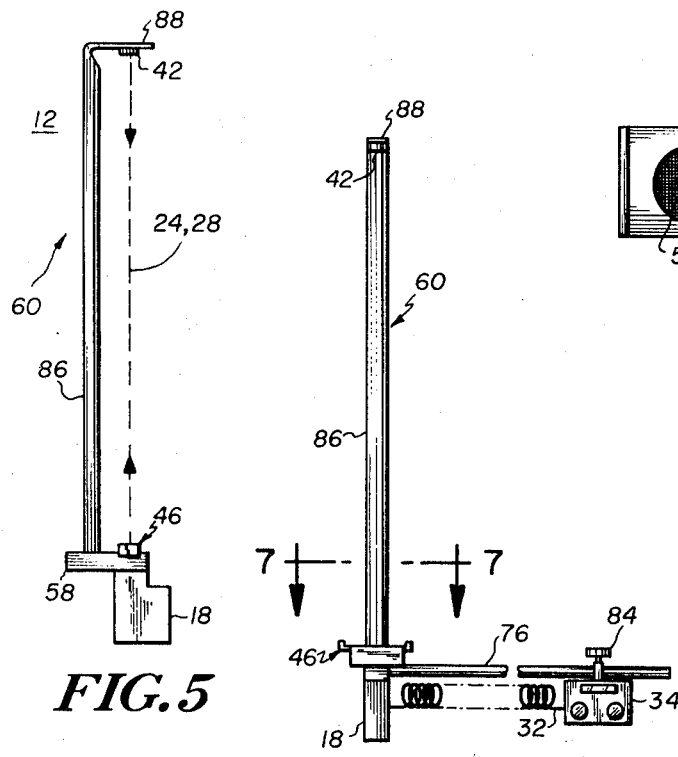
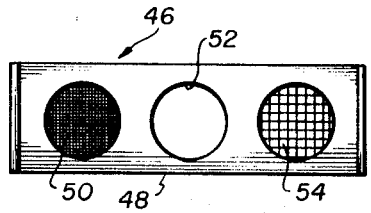
FIG.4
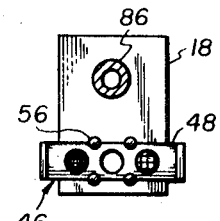
FIG.7
FIG.5
FIG.6
INVENTOR.
HARRY EINSTEIN
BY Lawrence I. Lerner
ATTORNEY

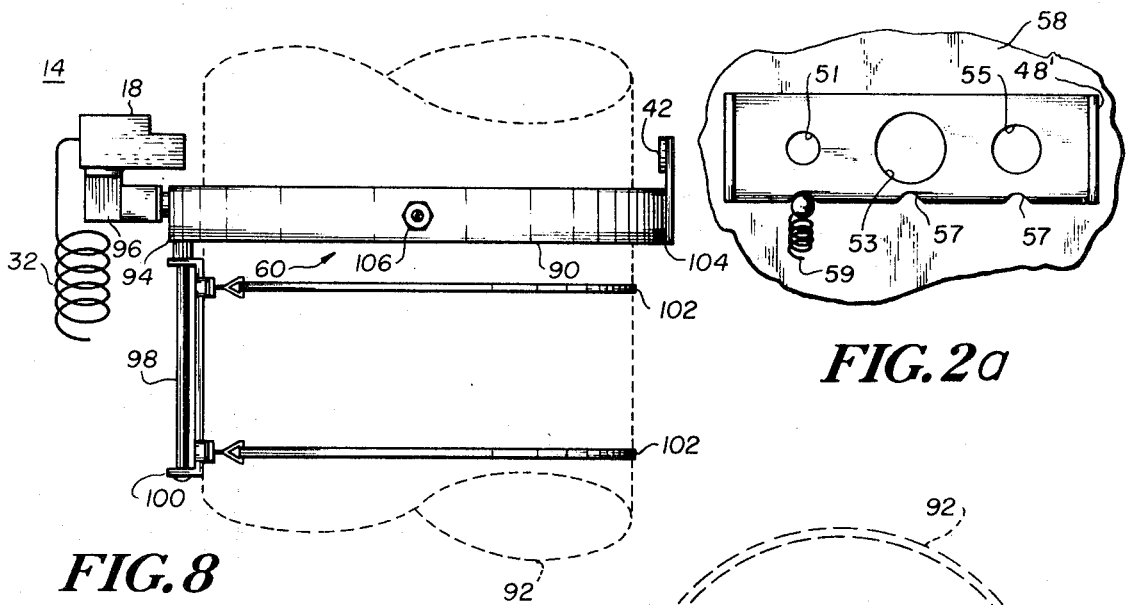# 
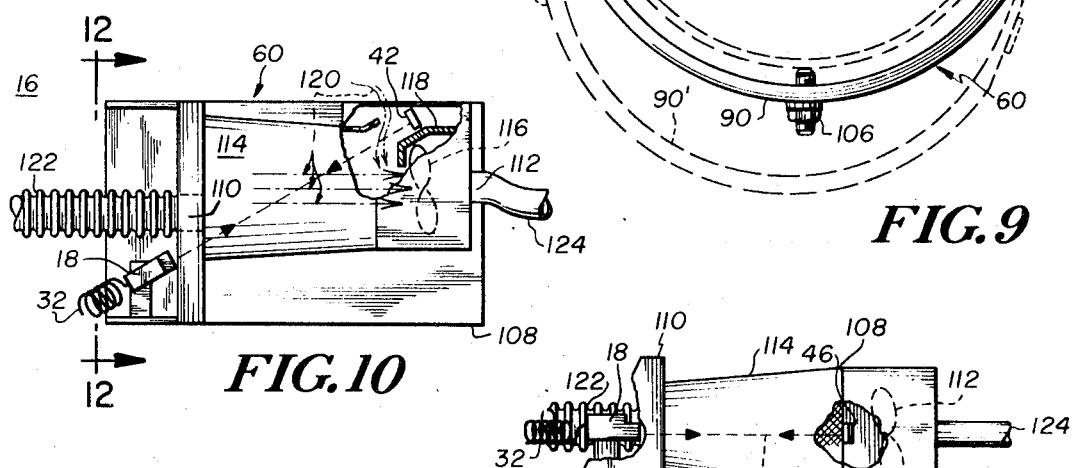
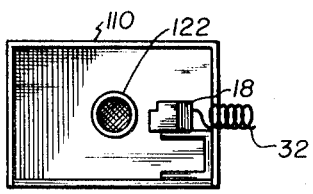

GAS MEASURING APPARATUS FOR DETECTING CONTAMINANTS

This invention is a continuation in part of application Ser. No. 681,517 filed Nov. 8, 1967, now U.S. Pat. No. 3,541,336 and entitled "Gas Monitoring Apparatus."

BACKGROUND OF THE INVENTION

This invention relates to gas measuring apparatus for detecting the presence of particles and other contaminants suspended in exhaust gases and the like, and more particularly relates to such gas measuring apparatus which is relatively simple, and therefore inexpensive to manufacture, carefree in operation, portable and easily adaptable to a variety of common pollution expelling environments.

Air pollution has become one of the major problems of our day. Because of this, it has become increasingly more important to determine the sources of pollutants and to thereby learn how to control these sources to limit the contamination of the air we breath.

There have been many attempts to produce apparatus which can measure various sources of air pollution. One type of apparatus being utilized operates on chemical principles and produces an indication of the level of air pollution by analyzing the reaction obtained when certain chemicals are combined with samples of the gas being analyzed. Another type of apparatus employs chromographic techniques to measure the change in electrical characteristics of various materials exposed to samples of the gas being analyzed, the change in electrical characteristics being proportional to the influence of the contaminants in the sample.

However, the above described systems and indeed other prior art apparatus available for detecting contaminants in the air, suffer from many disadvantages which will be shown, the instant invention effectively eliminates. Thus, prior art apparatus is technically complex and therefore costly to manufacture and maintain. Additionally, the components of such prior art apparatus are extremely fragile and subject to breakage whereby the apparatus is frequently in its "down state," subject to repair. Also, many if not all of the prior art systems require that the contaminated gas come into intimate contact with the various sensing components thereof such that over extended periods of use, frequent service for cleaning the various components is required. The relatively complex systems of the prior art do not lend themselves to being portable in nature. To the contrary, they must be accurately and firmly lodged at the site where the gas sample is taken. Finally, the systems of the prior art, are uniquely designed for a particular sampling embodiment, there being no basic system which can be simply and easily adapted to measure exhaust gases and the like in the multiplicity of environments where such gases are generated.

SUMMARY OF THE INVENTION

In contradistinction, the instant invention provides gas measuring apparatus for detecting the presence of particles and other contaminants suspended in exhaust gases and the like which is relatively simple and therefore inexpensive and easy to manufacture. As opposed to the fragile, difficult to calibrate, chemical and/or chromographic techniques utilized in the prior art, the gas measuring apparatus of the instant invention employs a simple, rugged photoelectric sensing system which detects the presence of contaminants and particles by optically sensing the effect such particles or contaminants have on a beam of light dispersed into the flow path of the gas being measured. In accordance with the invention, the photoelectric sensing system is positioned out of the path of the gas being measured whereby none of the components thereof will become soiled, thereby substantially reducing service problems associated with cleaning the device.

As will be shown, the gas measuring apparatus of the instant invention is extremely portable in nature and in fact includes a basic system which can be simply and easily adapted to a variety of positioning support frames specifically designed to locate the photoelectric sensing system in operative relationship with respect to many different types of pollution sources. Furthermore, and as a particularly advantageous feature of the invention, each of the various embodiments of the measuring apparatus may be provided with a self contained calibration system whereby predetermined pollution levels can be easily established.

Accordingly, it is an object of the instant invention to provide gas measuring apparatus for detecting the presence of particles and other contaminants suspended in the exhaust gases and the like.

Another object of the instant invention is to provide such gas measuring apparatus which includes a sensing system positionable out of the path of the gas being measured and capable of providing an output signal representative of the presence of contaminants in the gas; and an output system responsive to the output signals of the sensing system for presenting a recognizable signal indicative of the amount of contaminants in the gas.

Another object of the instant invention is to provide such a gas measuring apparatus wherein the sensing system thereof operates on photoelectric principles to disperse a beam of radiation into the gas being monitored and to detect the amount of light reflected therefrom, the difference therebetween being attributable and proportional to the amount of particles and contaminants suspended in the gas being measured.

Yet another object of the instant invention is to provide such a gas measuring apparatus wherein the photoelectric sensing system thereof is preferably a transceiver combining a source of radiation and detector in a single housing, and wherein such transceiver is always positioned out of the path of the gas being measured to prevent contamination therefrom.

Another object of the instant invention is to provide such gas measuring apparatus employing a transceiver type of photoelectric sensing system and which further employs a reflector similarly positioned out of the path of the gas being measured to reflect light back toward the transceiver.

Yet another object of the instant invention is to provide such gas measuring apparatus which can be quickly and easily provided with selectable filters of varying optical characteristics to easily establish predetermined reference levels of pollution.

Still another object of instant invention is to provide such gas measuring apparatus which is lightweight, portable, rugged, and easy to calibrate.

Another object of the instant invention is to provide such gas measuring apparatus which can be easily provided with a variety of positioning assemblies which facilitates the location of the photoelectric sensing system thereof in operative relationship with a plurality of different types of pollution expelling sources.

These and other objects of the instant invention may be had by referring to the following specification and drawings in which:

FIG. 1 shows a first embodiment of the gas measuring apparatus of the instant invention;

FIG. 1a shows a perspective view of a funnelled basketlike structure useful in accurately seating the apparatus of FIG. 1 in operative relationship with respect to common exhaust pipes;

FIG. 2 is a view taken along the arrow 2–2 of FIG. 1;

FIG. 2a shows another embodiment of the plate used in the optical calibration unit by which the optical reference levels may be established by a series of openings of various diameters;

FIG. 3 is a view of the apparatus of FIG. 1 taken along the arrows 3–3 thereof;

FIG. 4 is a plan view of a selectable calibration arrangement useful in the embodiment of FIG. 1 and also adaptable to cooperate with various other embodiments of the instant invention;

FIG. 5 is a plan view of an alternative embodiment of the instant invention useful in measuring gases expelled by larger diametered exhaust pipes and stacks than can be conveniently measured by the apparatus of FIG. 1;

FIG. 6 is a front view of the apparatus of FIG. 5;

FIG. 7 is a view of the apparatus of FIGS. 5 and 6 taken along the arrows 7–7 of FIG. 6;

FIG. 8 is a front view of yet another alternative embodiment of the gas measuring apparatus of the instant invention which is intended to measure gases flowing through large pipes and stacks;

FIG. 9 is a plan view of the apparatus of FIG. 8;

FIG. 10 is a plan view of yet another alternative embodiment of the gas measuring apparatus of the instant invention particularly adapted to measure gases expelled from exhaust pipes of automobiles and other vehicles;

FIG. 11 is a front view of the apparatus of FIG. 10; and

FIG. 12 is a view of the apparatus of FIGS. 10 and 11 taken along the arrows 12–12 of FIG. 10.

Turning to the drawings FIGS. 1—12 illustrate a plurality of different embodiments of the gas measuring apparatus of the instant invention. Thus, in FIGS. 1—4, a first embodiment 10 of the instant invention is shown which is particularly adaptable to detect the presence of particles and other contaminants in the exhaust gases of relatively small pipes and stacks such as for example, the exhaust pipe of a diesel tractor-trailer, the gas expelling output end of which is customarily located approximately 10 to 15 ft. above the ground. FIGS. 5, 6 and 7 illustrate an embodiment 12 of the gas measuring apparatus of the instant invention which is particularly useful for measuring gases expelled from larger diametered exhaust pipes, stacks, and the like wherein the open expelling end of such devices is still reasonably accessible. FIGS. 8 and 9 illustrate a third embodiment 14 of the gas measuring apparatus of the instant invention which is useful for measuring gas flowing in large pipes and stacks wherein the expelling open end of such stacks are not accessible. Finally, FIGS. 10—12 illustrate a fourth embodiment 16 of the gas measuring apparatus of the instant invention which is particularly useful for measuring exhaust gases of automobiles and the like, for instance at a motor vehicle inspection station. It should be noted that although the various embodiments 10, 12, 14 and 16 are designed with specific applications in mind, they all share a common system, to be described immediately below, which is the heart of the gas measuring apparatus of the instant invention. As noted previously, it is a particularly advantageous feature of the instant invention that this basic system can be simply and easily converted to any one of the above described embodiments to fulfill a specific gas measuring function. In fact, once the basic system is described it will be apparent that various other specifically tailored embodiments employing the basic system of the invention can be designed to measure new pollution sources as they arise.

Turning now to FIG. 1, the common system of each of the various embodiments will now be described, it being understood that the basic system to be described for the embodiment 10 is equally applicable to the embodiments 12, 14 and 16 of the other figures. To make this point explicitly clear, like numerals will be used to identify similar components of the various embodiments.

Thus the embodiment 10 includes a basic sensing system 18 for providing an output signal representative of the presence of particles and other contaminants suspended in the gas 20 being measured. Preferably, the sensing system 18 employs photoelectric sensing principles and to that end includes a source of radiation 20 which disperses a beam of radiation 24 into the gas 20. Preferably, the source 20 emits white light but it is to be understood that if desired an ultraviolet or infrared light source can be utilized for other contaminants normally invisible in the gas 20. The sensing system 18 further includes a radiation detector, preferably a common photo cell 26, which senses the return of the radiation, indicated by the reversed arrows 28. The semitransparent mirror 22 directs some of the returned radiation to the detector 26.

Partial or complete interruption of the beam, attributable to the quantity of contaminants and particles in the gas 20 is detected by the photo cell 26 and produces an output signal which is transported by means of an expansible cable 32 to an output system 34 including an amplifier-controller 36 which converts the output signal to a useable electric signal which can deflect an indicator 38 to provide a recognizable signal indicative of the amount of contaminants in the gas 20. It is to be understood that the sensing system 18 and the output system 34 including the amplifier-controller 36 and the indicator 38 are standard articles of commerce and will not be described in any greater detail. Sufficient to note that a suitable source of such equipment is Nebetco Engineering, 1107 Chandler Avenue—Roselle, N.J.

To be appreciated from the description thus far presented, is the fact that the entire sensing system 18 is located out of the path of the gas 20 whereby it will not be exposed to the contamination flowing therein. This is to be contrasted from the prior art systems which require that a sample of the contaminated air be drawn into the measuring apparatus. Also to be appreciated is the fact that the entire system 18 including the source of radiation 20 and the detector 26 is located in a single housing 40 such that the resulting system, conveniently called a light transceiver, is relatively simple and inexpensive to manufacture. (However, it is within the scope of the instant invention that the detector 26 could, if desired, be located on the opposite side of the gas 20, out of its path, to prevent the contamination thereof.) If a transceiver system is utilized, a reflector 42 is located at the opposite side of the gas 20 out of its path to prevent any accumulation of dirt and particles thereon.

When testing for the presence of black, light-absorbing particles, it is the amount of radiation which is not absorbed by these particles which is reflected by the reflector 42 and detected by the photocell 26 to provide an indication of the quantity of contamination in the gas. If white particles are to be sensed, the reflector 42 is covered by a nonreflective cover, (not shown) such that only the amount of light which is reflected from the white particles themselves will be detected by the photocell 26 to provide the indication of pollution. When sensing white particles, however, a different transceiver 18 would be utilized, one having a greater sensitivity and stronger light source 20.

To calibrate the measuring apparatus of the instant invention it is merely necessary to obtain a reading on the indicator 38 when the radiation is traversing ambient air which does not include the pollution containing gas 20. The reading obtained thereby becomes the reference from which the actual pollution measuring indications can be compared. Preferably, a know 44 is rotatable to locate the indicator 38 at zero point on the scale therebeneath when testing the ambient atmosphere.

Another common feature applicable to all of the embodiments 10, 12, 14 and 16 is the utilization of a self-contained optical calibration unit 46 comprising an elongated plate 48 having a plurality of apertures 50, 52 and 54 therein. Aperture 52 is left open while apertures 50 and 54 are masked with filters having preselected optical characteristics to establish predetermined reference levels of pollution when these filters are located in the path of the radiation generated by the source 20. As best seen in FIG. 2, the plate 48 is slidably mounted as for example by means of bearings 56 secured on an end plate 58 to be described in greater detail, such that the plate 48 can be slid to locate either the open aperture 52 or any one of the filters 50 and 54 in the path of the beam 24, 28. It is noted that although the calibration unit 46 has been shown in the drawing as applied only to the embodiments 10 and 12, such a filter arrangement may be equally applied in front of the sensing system 18 of the embodiments 14 and 16 of FIGS. 8 and 10 respectively. In a simpler, more preferred embodiment, the optical reference levels may be established by a series of openings of various diameters such as shown at 51, 53, and 55 in FIG. 2-A. The result will be similar to the various diaphragm openings of a camera system and will permit the system to be operated with preselected amounts of light. With such an embodiment the plate 48' of FIG. 2A is provided with notches 57 and the end plate 58 provided with a spring biased detent means 59 to accurately locate the respective aperture in proper relationship with respect to the source.

The one final element found in all of the various embodiments of the instant invention may be broadly designated positioning apparatus 60 in the various drawings for accurately locating the sensing system 18 in operative relationship with respect to the gas to be measured and for additionally supporting the reflector 42 in proper alignment with the beam 24, 28.

Thus the embodiment 10 of FIG. 1, the positioning means 60 includes a longitudinally extending frame 62 comprised of a plurality of rigid wirelike struts 64 parallelly disposed about a pair of end plate members 58 and 66, the plate 58 being secured to the housing 40. Although not shown it is, of course, obvious that the end plate 58 is provided with a central aperture through which the beam 24, 28 may pass. The struts 64 are spaced close enough that any two adjacent struts define a planer surface which can be rested upon the top of a small pipe or stack which is expelling the gas to be measured. Additionally, the struts 64 may include outstanding projections 68 which function as limit stops to define the longitudinal section of the frame 62 within which the end of the pipe being measured should be located.

Since many exhaust pipes, stacks and the like terminate in other than regular cylindrical openings, and since even many cylindrically terminated exhaust pipes decay into jagged terminations, the positioning assembly 60 of the embodiment 10 of FIG. 1 may further include an inverted funnellike basket member 70 (FIG. 1a) which includes hooklike projections 72 by which the member 70 can be hung from any of the various struts 64, again within the confines established by the projections 68. With the aid of the basketlike member 70, hanging from the frame 62, it is a relatively simple matter to locate the gas measuring apparatus over the end of any size or shaped pipe or stack. Of course a more conventional funnel structure fabricated from sheet metal or plastic can be utilized.

The entire apparatus including the sensing system 18 and the positioning assembly 60 is carried at one end 74 of an elongated post 76, the opposite, end 78 of which can be conveniently hand grasped by the user. The post may consist of extensible or collapsible tubes if desired. The housing 40 is preferably pivotally connected to the end 74 by means of a rotatable arrangement 80. Furthermore, the output system 34 is slidably positionable on the rod 76 by means of a circular band 82 which circumscribes the post 76 and includes a hand knob 84 therethrough which can be manually tightened to secure the output system at any convenient point along the post. The expansible cable 32 is useful in the situation where the sensing system 34 is slid relatively far down the end 78 of a lengthy post 76.

Turning to FIGS. 5—7, the embodiment 12 of the gas measuring apparatus of the instant invention is as noted previously, very similar to the embodiment 10 of FIGS. 1—4 and therefore like numerals have been used to designate like elements. The primary difference is that the positioning assembly 60 of the embodiment 12 comprises simply an elongated support rod 86 secured at one end to the end plate member 58 and at its opposite end provided with a transverse flange 88 which carries the reflector 42.

As suggested in FIG. 6, the embodiment 12, like the embodiment 10 of FIG. 1, is preferably hand-held by means of the post 76 above relatively larger diametered stacks and the like which do not require the frame 62 of FIG. 1 to properly locate the sensing system 18 with respect to the gas monitored. Of course, if desired an inverted basketlike arrangement similar to the element 70 of FIG. 1a could be suspended from the support rod 86 to facilitate the housing process.

Turning to FIGS. 8 and 9, there is shown the third embodiment 14 of the measuring apparatus of the instant invention. In this embodiment, the positioning means 60 comprises an arcuate support member 90 which partially circumvents a pipe or stack 92. This arrangement is particularly useful for tall stacks where it is impossible to reach the upper exit point thereof. Additionally, this embodiment being a more permanent device, lends itself to continuous measurement or monitoring.

One end 94 of the arcuate member 90 carries the sensing system 18 by means of an "L" shaped support 96. The end 94 is additionally secured to a vertical rod 98 which is freely rotatable within apertures provided in a frame 100 secured to the stack 92 by bands 102 thereabout. The opposite end 104 of the arcuate member 90 carries the reflector 42. When functioning to monitor the gas flowing through the stack 92, the arcuate member 90 rests against the stack 92, with adjustment or alignment of the optical components being made by adjustable stop 106. The system swings open to permit measurement in ambient air. Reference slide filters, such as shown in FIG. 2 and 2A, are used in the ambient air position. Although not clearly shown in FIGS. 8 and 9, it is to be understood that when using the embodiment 14, suitable apertures must be provided in the stack 92 to permit the passage of the radiation beam therethrough.

Turning to FIGS. 10—12, there is shown the last embodiment 16 of the gas monitoring apparatus of the instant invention in which embodiment the positioning assembly 16 actually comprises and enclosed chamber 108 on the exterior of which are supported the sensing system 18 and the reflector 42. The chamber includes an inlet port 110 and an exit port 112 between which is established a flow path 114 for the gas being measured. Preferably an exhaust fan 116 is utilized to draw the gas out the port 112. A baffle plate 118 is provided adjacent the reflector 42 such that any laminar flow of the gas 114 which might disburse laterally out of the central flow path will avoid contaminating the reflector 42 as suggested by the arrows 120.

Secured about the inlet port 110 is a flexible hollow conduit 122 which can easily be secured on to the exhaust pipes of automobiles, trucks, and other vehicles. The embodiment 16 could conveniently be utilized in motor vehicle inspection stations to quickly provide an indication of the effectiveness of the exhaust system of vehicles. If the unit is being operated within a confined area, an outlet tube 124 is preferably connected at one end to the exit port 112 and its opposite end (not shown) to the outside of the station such that the operators would not be exposed to excessive amounts of carbon monoxide.

Thus there has been described gas measuring apparatus which in a plurality of different embodiments, employs photoelectric sensing means to detect the presence of particles and other contaminants in the gas being measured. All of the embodiments possess common features such as locating the photoelectric sensing system out of the path of the gas to prevent contamination thereof and each include simple positioning system whereby the apparatus can be properly located with respect to the gas being measured. All of the embodiments are simple, rugged, lightweight, portable and require little if any servicing.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

I claim:

1. Gas measuring apparatus for detecting the presence of particles and other contaminants suspended in exhaust gases and the like comprising:
    sensing means positionable out of the path of the gas being measured, said sensing means being capable of providing an output signal representative of the presence of particles and other contaminants suspended in said gas;

output means responsive to said output signal of said sensing means for converting said output signal into a recognizable signal indicative of the amount of contaminants in said gas;

wherein said sensing means comprises a source of radiation for dispersing radiation into said gas being measured, and radiation sensitive detector means responsive to the magnitude of radiation returned from said gas for producing said output signal;

wherein said source of radiation and said radiation sensitive detector means are both mounted within a single housing positioned at preselected location adjacent to and on one side of the gas being measured;

further including reflector means supported at a second preselected location out of the path of the gas being measured, said second preselected location being chosen to reflect radiation generated by said radiation source back toward said radiation sensitive detector means in radiation paths which pass through said gas being measured, whereby the amount of radiation which is sensed by said detector means will differ from the amount of radiation generated by said radiation source by an amount which is attributable to absorption by particles and other contaminants in said gas; and wherein said reflector means is supported at its second preselected location by support means secured at one end to said single housing and at its opposite end to said reflector means.

2. The gas measuring apparatus of claim 1 and further including cover means for selectively making said reflector means totally nonreflective whereby said detector means will detect radiation reflected by particles and other contaminants in said gas.

3. The gas measuring apparatus of claim 2 wherein said sensing means is located at a preselected location adjacent to but out of the path of the gas being measured.

4. The gas measuring apparatus of claim 1 and further including calibration means selectively positionable in the path of said radiation for establishing predetermined reference levels of pollution.

5. The gas measuring apparatus of claim 4 wherein said calibration means comprises a plate member having at least two apertures therein, one of said apertures being open, one of said apertures being masked by a filter of chosen optical characteristics, said plate member being slidably mounted with respect to said housing such that either of said apertures may be located in the path of radiation.

6. The gas measuring apparatus of claim 4 wherein said calibration means comprises a plate member having a plurality of apertures of preselected diameter relationships with respect to one another, said plate member being movably mounted with respect to said sensing means such that any one of said apertures may be located in the path of radiation.

7. Gas measuring apparatus for detecting the presence of particles and other contaminants suspended in exhaust gases and the like comprising:

sensing means positionable out of the path of the gas being measured, said sensing means being capable of providing an output signal representative of the presence of particles and other contaminants suspended in said gas;

output means responsive to said output signal of said sensing means for converting said output signal into a recognizable signal indicative of the amount of contaminants in said gas;

wherein said sensing means comprises a source of radiation for dispersing radiation into said gas being measured, and radiation sensitive detector means responsive to the magnitude of radiation returned from said gas for producing said output signal;

wherein said source of radiation and said radiation sensitive detector means are both mounted with a single housing positioned at a preselected location adjacent to and on one side of the gas being measured; and wherein said positioning means includes a longitudinally extending frame including a plurality of struts radially disposed about a pair of end plate members.

8. The gas measuring apparatus of claim 7 and further including reflector means for reflecting radiation generated by said source of radiation back toward said detector means, said reflector means being supported on said second of said pair of end plate members out of the path of the gas being measured.

9. The gas measuring apparatus of claim 7 wherein said positioning means further includes locating means secured to preselected ones of said struts for firmly locating said frame above a vessel dispersing the gas to be measured.

10. The gas measuring apparatus of claim 9 wherein said locating means comprises an inverted funnellike member slidably disposed on preselected ones of said funnellike member thereon.

11. Gas measuring apparatus for detecting the presence of particles and other contaminants suspended in exhaust gases and the like comprising:

sensing means positionable out of the path of the gas being measured, said sensing means being capable of providing an output signal representative of the presence of particles and other contaminants suspended in said gas;

output means responsive to said output signal of said sensing means for converting said output signal into a recognizable signal indicative of the amount of contaminants in said gas;

wherein said sensing means comprises a source of radiation for dispersing radiation into said gas being measured, and radiation sensitive detector means responsive to the magnitude of radiation returned from said gas for producing said output signal;

wherein said source of radiation and said radiation sensitive detector means are both mounted within a single housing positioned at a preselected location adjacent to and on one side of the gas being measured;

further including positioning means connected to said sensing means for accurately locating said sensing means in operative relationship with respect to the gas to be measured; and further including positioning means connected to said sensing means for accurately locating said sensing means in operative relationship with respect to the gas to be measured; and wherein said positioning means includes an arcuate support member carrying said sensing means out of the path of the gas being measured, said arcuate support member having fastening means for pivotally securing said support member to the exterior of a stack within which the gas to be measured is flowing, said stack being provided with aperture means aligned with said sensing means to permit the introduction of said radiation into said stack.

12. The gas measuring apparatus of claim 11 further including reflector means for reflecting radiation generated by said source of radiation back toward said detector means, said reflector means being supported on a second end of said arcuate support member out of the path of the gas being measured, said stack being provided with a second aperture aligned with said reflector means.

13. The gas measuring apparatus of claim 12 and further including calibration means selectively positionable in the path of said radiation for establishing predetermined reference levels of pollution.

14. The gas measuring apparatus of claim 13 wherein said calibration means comprises a plate member having at least two apertures therein, one of said apertures being open, one said apertures being masked by a filter of chosen optical characteristics, said plate member being slidably mounted with respect to said sensing means such that either of said apertures may be located in the path of radiation.

15. The gas measuring apparatus for detecting the presence of particles and other contaminants suspended in exhaust gases and the like comprising:

sensing means positionable out of the path of the gas being measured, said sensing means being capable of providing an output signal representative of the presence of particles and other contaminants suspended in said gas;

wherein said sensing means comprises a source of radiation for dispersing radiation into said gas being measured, and radiation sensitive detector means responsive to the magnitude of radiation returned from said gas for producing said output signal;

wherein said source of radiation and said radiation sensitive detector means are both mounted within a single housing positioned at a preselected location adjacent to and on one side of the gas being measured;

further including positioning means connected to said sensing means for accurately locating said sensing means in operative relationship with respect to the gas to be measured; and wherein said positioning means, includes an enclosed chamber having an input port for the entrance of the gas to be measured and an exit port for the exit of the gas being measured to define a flow path of said gas therebetween, said sensing means being mounted on said chamber to disperse radiation into said flow path.

16. The gas measuring apparatus of claim 15 and further including flexible conduit means connected to said input port for facilitating the measuring of gases generated at locations remote from said chamber.

17. The gas measuring apparatus of claim 15 and further including exhaust fan means located within said chamber for drawing said gas out of said chamber through said exit port.

18. The gas measuring apparatus of claim 15 wherein said single housing is supported on the exterior of said enclosed chamber, said chamber being provided with an aperture aligned with said sensing means to permit the entry of said radiation into said chamber.

19. The gas measuring apparatus of claim 18 and further including reflecting means for reflecting radiation generated by said source of radiation back toward said detector means, said reflector means being located outside said chamber.

20. The gas measuring apparatus of claim 19 and further including baffle means located adjacent said reflector means for preventing said gas from contacting said reflector means.

21. The gas measuring apparatus of claim 15 and further including calibration means selectively positionable in the path of said radiation for establishing predetermined reference levels of pollution.

22. The gas measuring apparatus of claim 21 wherein said filter means comprises a plate member having at least two apertures therein, one of said apertures being open, one of said apertures being masked by a filter of chosen optical characteristics, said plate member being slidably mounted with respect to said sensing means such that either of said apertures may be located in the path of radiation.

23. The gas measuring apparatus of claim 7 wherein said struts include outstanding projection means for defining a section of said frame within which said gas is to flow.